(12) United States Patent
Wheelock et al.

(10) Patent No.: US 9,251,844 B1
(45) Date of Patent: Feb. 2, 2016

(54) WATERFALL METHOD AND APPARATUS FOR A DATA STORAGE DEVICE READ SYSTEM

(71) Applicant: Western Digital Technologies, Inc., Irvine, CA (US)

(72) Inventors: David W. Wheelock, Longmont, CO (US); Shafa Dahandeh, Laguna Niguel, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/682,048

(22) Filed: Apr. 8, 2015

Related U.S. Application Data

(60) Provisional application No. 62/006,644, filed on Jun. 2, 2014.

(51) Int. Cl.
*G11B 27/36* (2006.01)
*G11B 20/10* (2006.01)

(52) U.S. Cl.
CPC ................................ *G11B 20/10046* (2013.01)

(58) Field of Classification Search
CPC ...... G11B 5/455; G11B 3/5166; G11B 27/36; G11B 20/10009; G11B 5/09; G11B 5/012
USPC ..................... 360/53, 31, 46, 97.12; 324/210; 29/603.09
See application file for complete search history.

(56) References Cited

U.S. PATENT DOCUMENTS

| 6,018,789 | A | 1/2000 | Sokolov et al. |
|---|---|---|---|
| 6,065,095 | A | 5/2000 | Sokolov et al. |
| 6,078,452 | A | 6/2000 | Kittilson et al. |
| 6,081,447 | A | 6/2000 | Lofgren et al. |
| 6,092,149 | A | 7/2000 | Hicken et al. |
| 6,092,150 | A | 7/2000 | Sokolov et al. |
| 6,094,707 | A | 7/2000 | Sokolov et al. |
| 6,105,104 | A | 8/2000 | Guttmann et al. |
| 6,111,717 | A | 8/2000 | Cloke et al. |
| 6,145,052 | A | 11/2000 | Howe et al. |
| 6,175,893 | B1 | 1/2001 | D'Souza et al. |
| 6,178,056 | B1 | 1/2001 | Cloke et al. |
| 6,191,909 | B1 | 2/2001 | Cloke et al. |
| 6,195,218 | B1 | 2/2001 | Guttmann et al. |

(Continued)

OTHER PUBLICATIONS

David W. Wheelock, et al., U.S. Appl. No. 14/644,730, filed Mar. 20, 2015, 29 pages.

*Primary Examiner* — Nabil Hindi

(57) ABSTRACT

A waterfall manufacturing process and apparatus are described for a data storage device. In an aspect, a determination is made during manufacturing of a magnetic storage medium reader system whether a first reader system provides less than a predetermined performance or is nonfunctioning. The reader system includes at least the first reader system and a second reader system with reader elements on the same head. When the first reader system is determined to provide less than the predetermined performance or is nonfunctioning, the reader system is reconfigured during the manufacturing to utilize the second reader system, but not utilize the first reader system, to read the magnetic storage medium. Alternatively, the reader system is reconfigured during manufacturing to read the magnetic storage medium at less than the predetermined performance, or the reader system is situated with a different data storage device configured to function with less than the predetermined performance.

20 Claims, 6 Drawing Sheets

(56) References Cited

U.S. PATENT DOCUMENTS

| | | |
|---|---|---|
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,373,649 B1 | 4/2002 | Walker et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,446,156 B1 | 9/2002 | Chia et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,633,442 B2 | 10/2003 | Quak et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,036 B2 | 6/2004 | Quak et al. |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,795,261 B2 | 9/2004 | Chia et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |

(56) References Cited

U.S. PATENT DOCUMENTS

| | | |
|---|---|---|
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,012,771 B1 | 3/2006 | Asgari et al. |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,471 B2 | 5/2006 | Meyer et al. |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,196,861 B2 * | 3/2007 | Ito .................. G11B 5/455 360/31 |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,324,860 B2 | 1/2008 | Dyer |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,409,498 B2 | 8/2008 | Henning et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,900,125 B1 | 3/2011 | Liu et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |

(56) References Cited

U.S. PATENT DOCUMENTS

| | | |
|---|---|---|
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, Iii |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,787 B1 | 7/2014 | Beker |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 2007/0025005 A1 | 2/2007 | Shimizu |
| 2009/0113702 A1 | 5/2009 | Hogg |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

\* cited by examiner

WATERFALL METHOD AND APPARATUS FOR A DATA STORAGE DEVICE READ SYSTEM

CROSS-REFERENCE TO RELATED APPLICATIONS

This application claims priority to provisional U.S. Patent Application Ser. No. 62/006,644, filed on Jun. 2, 2014, which is herein incorporated by reference in its entirety. The subject matter of the present application is also related to U.S. patent application Ser. No. 14/644,730, filed on Mar. 20, 2015, which is incorporated by reference in its entirety as if stated herein.

BACKGROUND

Magnetic storage systems are utilized in a wide variety of devices in both stationary and mobile computing environments. Magnetic storage systems include hard disk drives (HDD), and solid state hybrid drives (SSHD) that combine features of a solid-state drive (SSD) and a hard disk drive (HDD). Examples of devices that incorporate magnetic storage systems include desktop computers, portable notebook computers, portable hard disk drives, servers, network attached storage, digital versatile disc (DVD) players, high definition television receivers, vehicle control systems, cellular or mobile telephones, television set top boxes, digital cameras, digital video cameras, video game consoles, and portable media players.

There is an ongoing effort within the magnetic storage system industry to increase storage capacity while maintaining the same external drive form factor. Track density has increased, and track pitch has decreased, such that magnetic read heads may detect more inter-track noise. Two-dimensional magnetic recording (TDMR) uses multiple read heads to read a single data track, and can improve the reading performance of a magnetic storage system with a high-density disk, as compared to a system using a single read head.

BRIEF DESCRIPTION OF THE DRAWINGS

The foregoing aspects and many of the attendant advantages described herein will become more readily appreciated by reference to the following detailed description, when taken in conjunction with the accompanying drawings, wherein.

DETAILED DESCRIPTION

Figure 1:
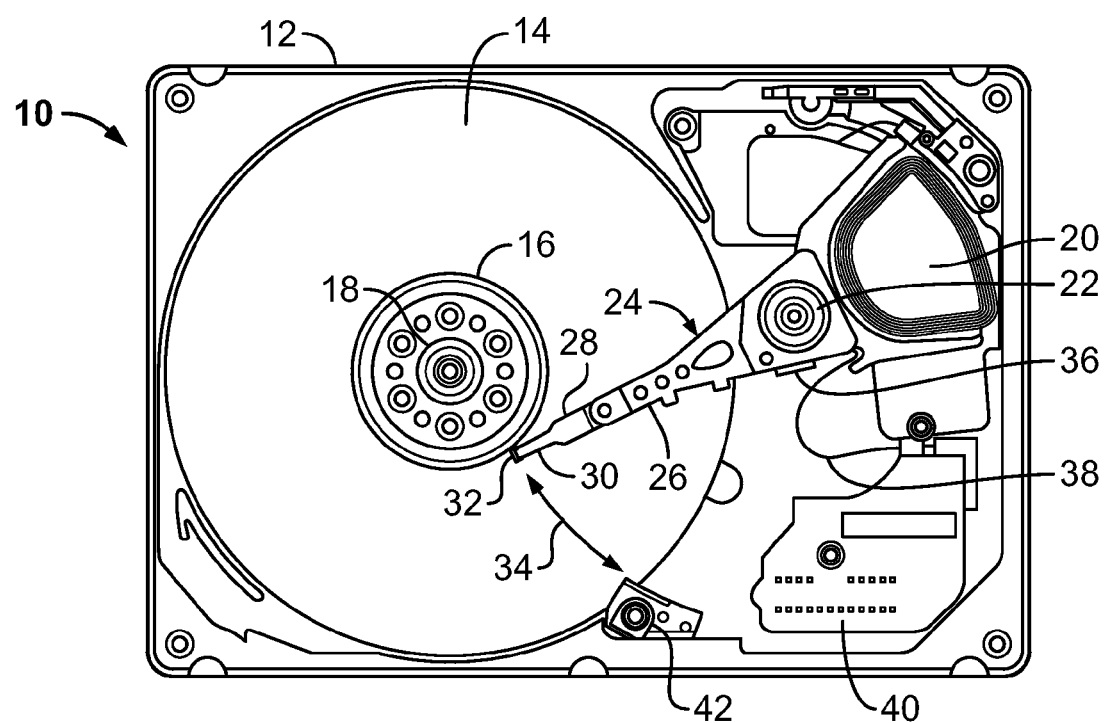
FIG. 1 is a top plan view of a disk drive data storage system in which embodiments are useful.

In the following description, numerous specific details are disclosed to provide a thorough understanding of embodiments of the method, system and apparatus. One skilled in the relevant art will recognize, however, that embodiments of the method, system and apparatus described herein may be practiced without one or more of the specific details, or with other electronic devices, methods, components, and materials, and that various changes and modifications can be made while remaining within the scope of the appended claims. In other instances, well-known electronic devices, components, structures, materials, operations, methods, process steps and the like may not be shown or described in detail to avoid obscuring aspects of the embodiments. Embodiments of the apparatus, method and system are described herein with reference to figures.

Reference throughout this specification to "one embodiment," "an embodiment," or similar language means that a particular feature, structure, electronic device, method or characteristic described in connection with the embodiment is included in at least one embodiment. Thus, appearances of the phrases "in one embodiment," "in an embodiment," and similar language throughout this specification may refer to separate embodiments or may all refer to the same embodiment. Furthermore, the described features, structures, methods, electronic devices, or characteristics may be combined in any suitable manner in one or more embodiments.

Magnetic storage system performance demands and design needs have intensified. The current demand for larger capacity in a smaller dimension is linked to the demand for ever increasing storage track density. As the density of data on a magnetic storage medium increases, the strength of the magnetic fields generally decrease, in order to minimize interference. With an increase in track density and decrease in track pitch, magnetic read heads may detect more inter-track noise. Two-dimensional magnetic recording (TDMR) can improve the reading performance of a magnetic storage system with a high-density disk, as compared to a system using a single read head. TDMR read heads counteract extraneous noise by using multiple read elements to read a single data track, and as such, help to create a better signal to noise ratio (SNR) during read back. Additionally, using TDMR, two or more tracks may be detected simultaneously.

However, with a conventional TDMR system with multiple read elements, or a single reader system, an entire media surface may be lost when a reader element is nonfunctioning. During the manufacturing stage of a TDMR system, a reader system may be tested, and the system testing may show that the reader system provides less than a predetermined performance or has failed. A waterfall model may be used to manufacture a TDMR system. A waterfall model is a sequential process, used in product development, in which progress is seen as flowing steadily downward, like a waterfall, through various product development phases.

A waterfall method, process, and an apparatus are described herein for a data storage device read system. In an embodiment, the waterfall method and process are employed during the manufacture of a magnetic recording device with a TDMR system. As one example, when a single reader element is determined during manufacturing to provide less than a predetermined performance or is nonfunctioning, control circuitry is reconfigured, and the remaining reader elements on the same head are utilized to manufacture a fully functioning magnetic recording device.

The determination of whether a reader element or reader system provides less than a predetermined performance or failed may be made during various stages in the manufacturing process, including during head stack testing.

In another embodiment, when the first reader system is determined to provide less than the predetermined performance, the first reader system is retained, and the magnetic storage medium reader system is reconfigured to read the magnetic storage medium at less than the predetermined performance. In yet another embodiment, the magnetic storage medium reader system is situated with an alternative data storage device, and configured to function with less than the predetermined performance.

In an embodiment, the methods and apparatus are utilized with a TDMR head. A conventional TDMR drive system selects specific reader elements for normal operation as a function of armature skew angle, servo performance, etc. Reader element selection may also be based on format/error correction capability as determined during drive manufacturing. These functions may be utilized in part by some embodiments described herein.

The apparatus, system and methods disclosed may be utilized, in an embodiment, with disk drive memory systems, and other memory systems utilizing a magnetic reading device, including a HDD and a SSHD.

Referring to the figures wherein identical reference numerals denote the same elements throughout the various views, FIG. 1 illustrates a disk drive storage system 10, in which embodiments are useful. Features of the discussion and claims are not limited to this particular design, which is shown only for purposes of the example.

Disk drive 10 includes one or more data storage disks 14 of computer-readable data storage media. Typically, both of the major surfaces of each data storage disk 14 include a plurality of concentrically disposed tracks for data storage purposes, including user data sectors and servo sectors. Each data storage disk 14 is mounted on a hub or spindle 16, which in turn is rotatably interconnected with a base plate 12 and/or cover. Multiple data storage disks 14 are typically mounted in vertically spaced and parallel relation on the spindle 16. A spindle motor 18 rotates the data storage disks 14 at an appropriate rate.

The disk drive 10 also includes an actuator arm assembly 24 that pivots about a pivot bearing 22, which in turn is rotatably supported by the base plate 12 and/or cover. The actuator arm assembly 24 includes one or more individual rigid actuator arms 26 that extend out from near the pivot bearing 22. Multiple actuator arms 26 are typically disposed in vertically spaced relation, with one actuator arm 26 being provided for each major data storage surface of each data storage disk 14 of the disk drive 10. Other types of actuator arm assembly configurations may be utilized as well, such as an assembly having one or more rigid actuator arm tips or the like that cantilever from a common structure. Movement of the actuator arm assembly 24 is provided by an actuator arm drive assembly, such as a voice coil motor 20 or the like. The voice coil motor (VCM) 20 is a magnetic assembly that controls the operation of the actuator arm assembly 24 under the direction of control electronics 40.

A suspension 28 is attached to the free end of each actuator arm 26 and cantilevers therefrom. The slider 30 is disposed at or near the free end of each suspension 28. What is commonly referred to as the read/write head (e.g., transducer) is mounted as a head unit 32 under the slider 30 and is used in disk drive read/write operations. As the suspension 28 moves, the slider 30 moves along arc path 34 and across the corresponding data storage disk 14 to position the head unit 32 at a selected position on the data storage disk 14 for the disk drive read/write operations. When the disk drive 10 is not in operation, the actuator arm assembly 24 may be pivoted to a parked position utilizing ramp assembly 42. The head unit 32 is connected to a preamplifier 36 via head wires routed along the actuator arm 26, which is interconnected with the control electronics 40 of the disk drive 10 by a flex cable 38 that is typically mounted on the actuator arm assembly 24. Signals are exchanged between the head unit 32 and its corresponding data storage disk 14 for disk drive read/write operations.

The data storage disks 14 comprise a plurality of embedded servo sectors each comprising coarse head position information, such as a track address, and fine head position information, such as servo bursts. As the head 32 passes over each servo sector, a read/write channel (or servo control system) processes the read signal emanating from the head to demodulate the position information. The control circuitry processes the position information to generate a control signal applied to the VCM 20. The VCM 20 rotates the actuator arm 26 in order to position the head over a target track during the seek operation, and maintains the head over the target track during a tracking operation.

The head unit 32 may utilize various types of read sensor technologies such as anisotropic magnetoresistive (AMR), giant magnetoresistive (GMR), tunneling magnetoresistive (TMR), other magnetoresistive technologies, or other suitable technologies.

Figure 2:
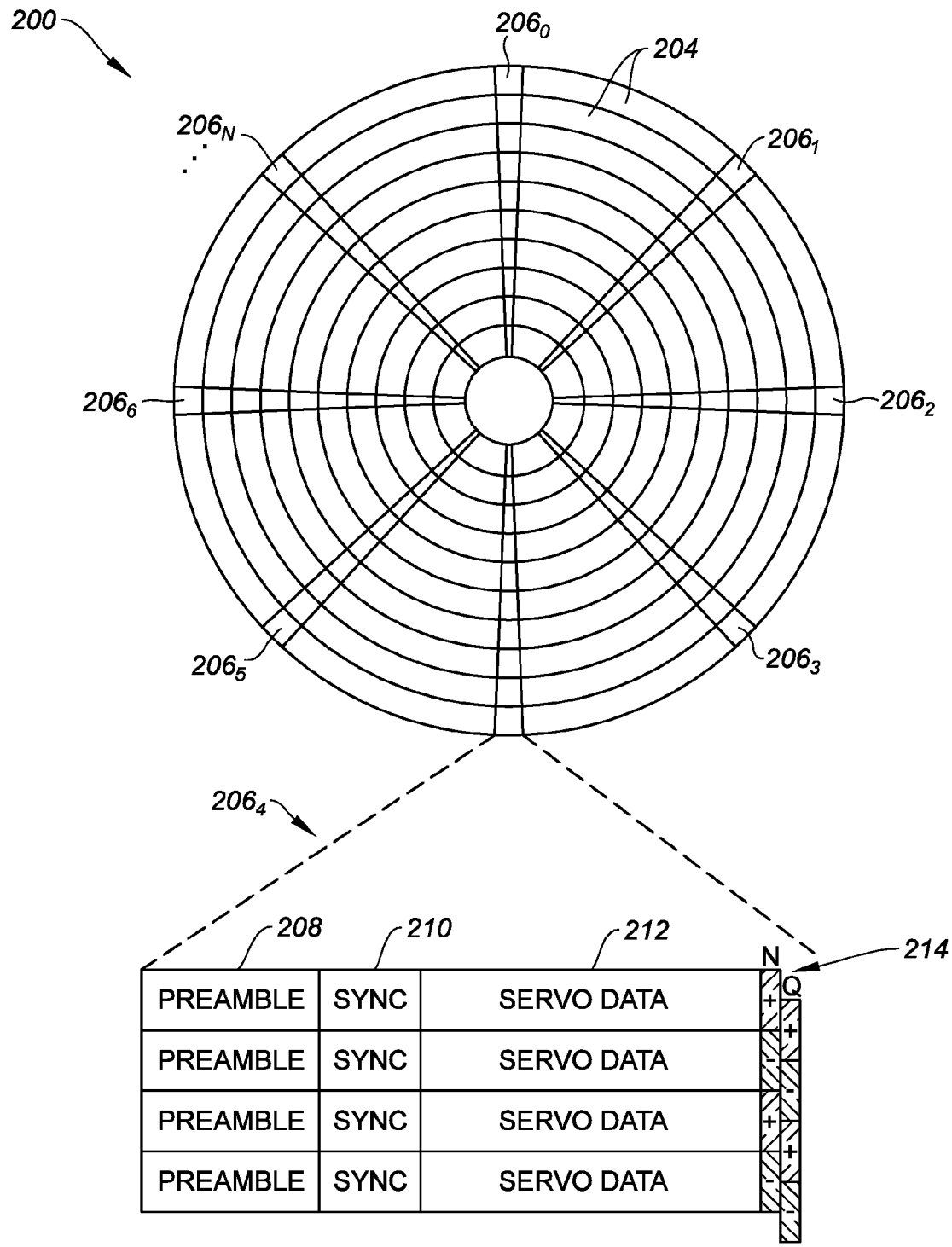
FIG. 2 is a top plan view of a data storage disk, showing servo tracks and servo sectors.

FIG. 2 shows a conventional disk format 200 including a number of servo tracks 204 defined by servo sectors $206_0$-$206_N$ recorded around the circumference of each servo track. Each servo sector $206_i$ includes a preamble 208 for storing a periodic pattern, which allows proper gain adjustment and timing synchronization of the read signal, and a sync mark 210 for storing a special pattern used to symbol synchronize to a servo data field 212. The servo data field 212 stores coarse head positioning information, such as a servo track address, used to position the head over a target data track during a seek operation. Each servo sector $206_i$ further includes groups of servo bursts 214 (e.g., N and Q servo bursts), which are recorded with a predetermined phase relative to one another and relative to the servo track centerlines. The phase based servo bursts 214 provide fine head position information used for centerline tracking while accessing a data track during write/read operations. A position error signal (PES) is generated by reading the servo bursts 214, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Figure 3:
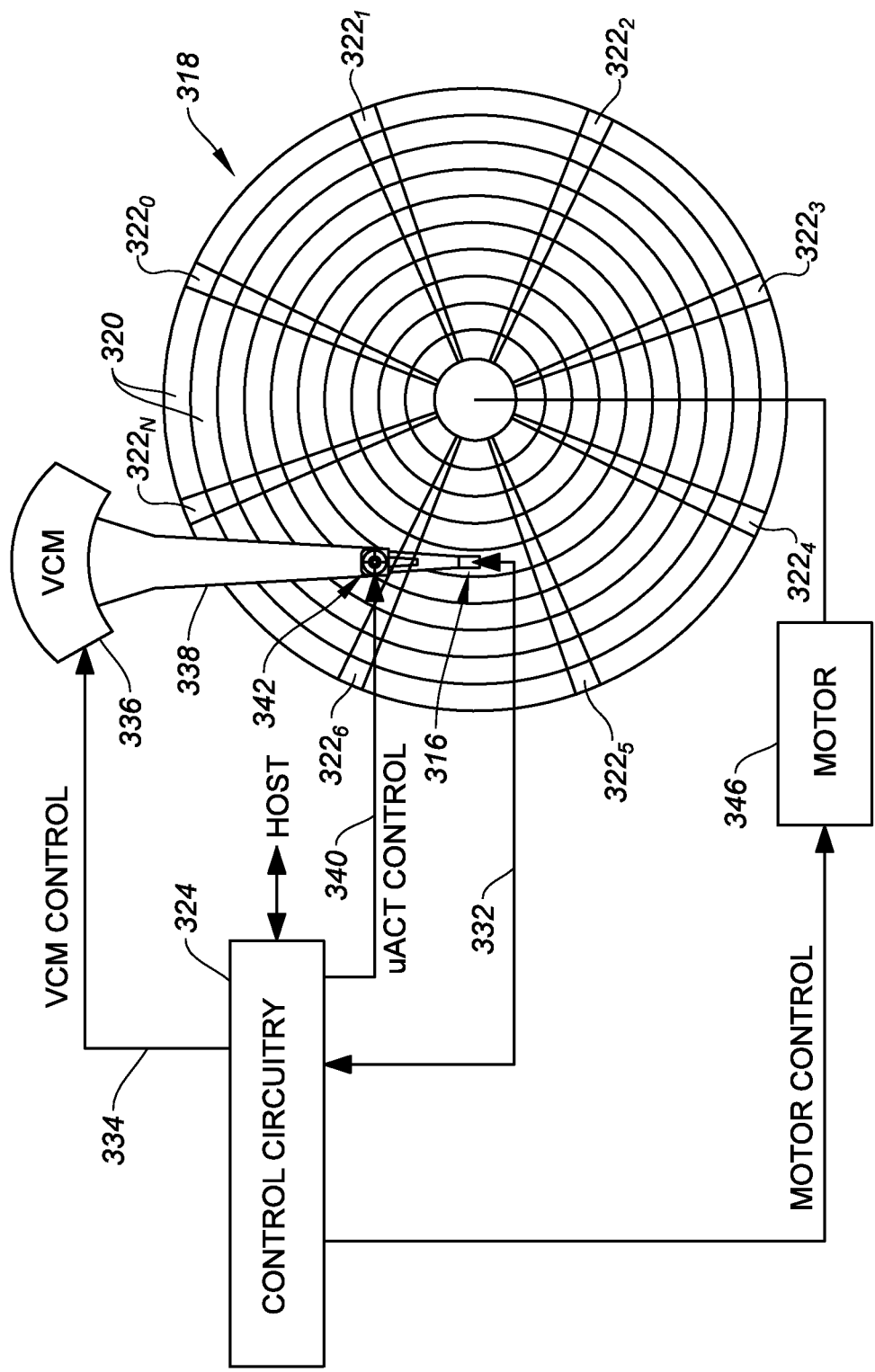
FIG. 3 is a top plan view of a hard disk drive (HDD) including a head and a disk including servo tracks, servo sectors, and control circuitry operable to actuate the head over the disk, in an embodiment.

Referring to FIG. 3, a portion of hard disk drive (HDD) is illustrated, according to an embodiment, including a head 316 and a disk 318. The disk 318 includes a plurality of servo tracks 320, wherein each servo track includes a plurality of servo sectors $322_0$-$322_N$. The disk drive further includes control circuitry 324 including a servo control system operable to actuate the head over the disk in response to the servo sectors $322_0$-$322_N$. The disk is rotated by a spindle motor 346 at a rotational speed that is controlled by the control circuitry 324, for example, a motor driver of the control circuitry 324.

Control circuitry 324 processes a read signal 332 emanating from the head 316 to demodulate the servo sectors $322_0$-$322_N$ and generate a position error signal (PES) representing an error between the actual position of the head and a target position relative to a target track. In an embodiment, the target track includes a target data track defined relative to the servo tracks 320, wherein the data tracks may be recorded at the same or different radial density than the servo tracks 320. The control circuitry 324 filters the PES using a suitable compensation filter to generate a control signal 334 applied to a voice coil motor (VCM) 336, which rotates an actuator arm 338 about a pivot in order to actuate the head 316 radially over the disk 318 in a direction that reduces the PES. The control circuitry 324 may also generate a control signal 340 applied to a microactuator 342 in order to actuate the head 316 over the disk 318 in fine movements. Any suitable microactuator 342 may be employed in the embodiments, such as a piezoelectric actuator. In addition, the microactuator 342 may actuate the head 316 over the disk 318 in any suitable manner, such as by actuating a suspension relative to the actuator arm, or actuating a slider relative to the suspension. The servo sectors $322_0$-$322_N$ may include any suitable head position information, such as a track address for coarse positioning and servo bursts for fine positioning. The servo bursts may include any suitable pattern, such as an amplitude based servo pattern or a phase based servo pattern.

To accomplish reading and writing of data to and from the disk, the control circuitry may include a read channel configured to process the read signal 332 from the head 316 and a write channel to prepare write signal 332 for sending to the head 316 for writing.

In an embodiment, head 316 is a TDMR head with multiple reader elements, allowing extraction of multiple read signals and subsequently improved SNR gains via signal processing the signal from multiple reader elements. The reader elements read the same track or adjacent tracks. In an embodiment, TDMR gains are provided when reading mostly the same track or processing signal from a main track and its adjacent tracks. In an embodiment, head 316 is a TDMR head that may be used with tracks including spiral data tracks, as well as conventional concentric data tracks.

In an embodiment, there is a separation between the individual reader elements, which can vary greatly over process, for each head. For a TDMR data or servo operation, the separation of the reader elements is situated for optimal digital signal processing (DSP) of the signals from the different reader elements. In an embodiment, the reader element separation is measured with high precision at different locations on the disk (e.g., adjusting for different actuator positions). In an embodiment, the TDMR head increases the data density of the recording media. In an embodiment, two reader elements, while accessing a target track, are separated and offset from a position centerline of the target track. In an embodiment, when the second reader element, but not the first reader element, is caused to read the magnetic storage medium, then the second reader element is repositioned to a position that is centerline to a target track.

In an embodiment, the magnetic storage medium reader system includes at least a first reader system and a second reader system. The first reader system includes a first reader element, and the second reader system includes a second reader element. Head 316 includes the first reader element and the second reader element. Control circuitry 324 is reconfigured during manufacturing of the magnetic storage medium reader system to cause the second reader system, but not the first reader system, to read a magnetic storage medium, when the first reader system is determined during the manufacturing to provide less than a predetermined performance or to be nonfunctioning.

In an embodiment, the second reader system is utilized with a non-two-dimensional magnetic recording (TDMR) data storage device.

In an embodiment, when the first reader system is determined during the manufacturing to provide less than a predetermined performance or to be nonfunctioning, the second reader system and a third reader system are utilized to read the magnetic storage medium. In this embodiment, the second reader system and the third reader system are utilized with a two-dimensional magnetic recording (TDMR) data storage device.

In an embodiment, when the first reader system is determined during the manufacturing to provide less than a predetermined performance or to be nonfunctioning, the magnetic storage medium reader system is reconfigured to i.) read at a track per inch (TPI) data density that is less than if the first reader system provided at least a predetermined performance and was additionally utilized, and/or ii.) provide a read signal at a signal to noise ratio (SNR) that is less than if the first reader system provided at least a predetermined performance and was additionally utilized.

In an embodiment, the second reader system includes a second reader element and a second read channel. The second reader system is structured such that when a second reader element signal is created, the second reader element signal travels from the second reader element to the second read channel. The first reader system includes a first reader element and a first read channel.

In an embodiment, when the second reader system is utilized to read the magnetic storage medium, the second reader system utilizes one portion or more than one portion of the second reader system to read the magnetic storage medium.

In an embodiment, when the first reader system is not utilized to read the magnetic storage medium, one portion or more than one portion of the first reader system is not utilized.

In an embodiment, the waterfall method and process described herein may include reconfiguring a reader system, changing servo operations, data formatting, and/or firmware control. In an embodiment, various servo control and data channel values may be encoded in one or more lookup tables, so these values provide options to accommodate various waterfall scenarios. In an embodiment, the waterfall process includes employing various pre-defined versions of firmware that can be selected for installation to a final drive product, depending on whether a waterfall process is utilized.

Figure 4:
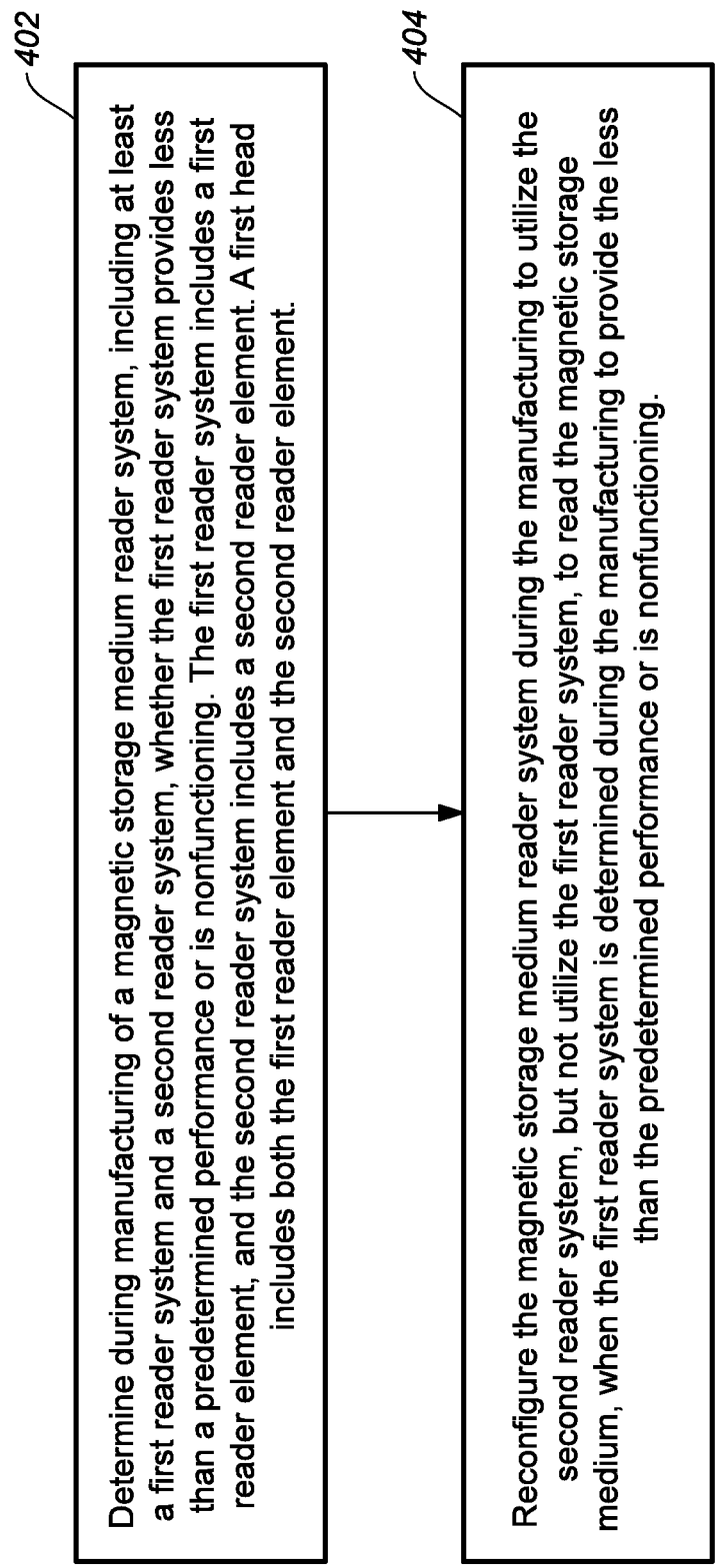
FIG. 4 is a flow diagram illustrating a waterfall method for a data storage system, in an embodiment.

FIG. 4 illustrates a waterfall method and process for manufacturing a data storage system, in an embodiment. Each step in the flowchart illustration can be implemented by computer program instructions, in an embodiment. These computer program instructions may be provided to a processor of a programmable data processing apparatus, such that the instructions execute via the processor to implement the functions or actions specified in the flowchart. The instructions may be executed by a controller. In an embodiment, the controller is a component of a data storage device, such as a disk drive storage system. In an alternative embodiment, the controller is separate from the data storage device and may be connected to the data storage device to externally monitor and communicate with the data storage device.

As detailed in step 402, it is determined during manufacturing of a magnetic storage medium reader system, including at least a first reader system and a second reader system, whether the first reader system provides less than a predetermined performance or is nonfunctioning, in an embodiment. The first reader system includes a first reader element, and the second reader system includes a second reader element. A first head includes both the first reader element and the second reader element.

Next, as stated in step 404, the magnetic storage medium reader system is reconfigured during the manufacturing to utilize the second reader system, but not utilize the first reader system, to read the magnetic storage medium, when the first reader system is determined during the manufacturing to provide less than the predetermined performance or is nonfunctioning.

In an embodiment, the second reader system is utilized with a non-two-dimensional magnetic recording (non-TDMR) data storage device, when the first reader system is determined to provide less than the predetermined performance or is nonfunctioning.

In an embodiment, the manufacturing of the magnetic storage medium reader system includes a reader system with a two-dimensional magnetic recording (TDMR) head. Following steps 402 and 404, the method further includes utilizing the second reader system with a non-TDMR data storage device, rather than with the TDMR data storage device, when the first reader system is determined to provide less than the predetermined performance or is nonfunctioning.

In an embodiment, following steps 402 and 404, the second reader system is utilized with a non-TDMR data storage device, whether or not the manufacturing of the magnetic storage medium reader system included a reader system with a TDMR head when the first reader system was determined to provide less than a predetermined performance or was nonfunctioning.

In an embodiment, following steps 402 and 404, the second reader system is utilized with a TDMR data storage device, when the manufacturing of the magnetic storage medium reader system included a reader system with a TDMR head, and when a third, a fourth or additional reader systems provide at least a predetermined performance.

In an embodiment, following steps 402 and 404, when the magnetic storage medium reader system further includes a third reader system, the second reader system and the third reader system are utilized with a two-dimensional magnetic recording (TDMR) data storage device.

In an embodiment, following step 402, when the magnetic storage medium reader system further includes a third reader system, a fourth reader system, or more than four reader systems, the magnetic storage medium reader system is reconfigured during manufacturing to utilize reader systems that are providing at least a predetermined performance (e.g., second reader system, third reader system, and fourth reader system). In an embodiment, following step 402, the magnetic storage medium reader system is reconfigured during manufacturing to utilize any number of reader systems or reader heads that are providing at least a predetermined performance.

In an embodiment, following steps 402 and 404, the magnetic storage medium reader system is reconfigured to at least read at a track per inch (TPI) data density that is less than if the first reader system provided at least the predetermined performance and was additionally utilized, and/or provide a read signal at a signal to noise ratio (SNR) that is less than if the first reader system provided at least the predetermined performance and was additionally utilized.

In an embodiment, the second reader system includes the second reader element and a second read channel. The second reader system is structured such that when a second reader element signal is created, the second reader element signal travels from the second reader element to the second read channel. The first reader system includes the first reader element and a first read channel.

In an embodiment, when the second reader system is utilized to read the magnetic storage medium, one portion or more than one portion of the second reader system is utilized to read the magnetic storage medium.

In an embodiment, when the first reader system is not utilized to read the magnetic storage medium, one portion or more than one portion of the first reader system is not utilized.

In an embodiment, when the first reader system is not utilized, at least one component of the first reader system is utilized with the magnetic storage medium reader system, but a signal from the first reader system is not utilized.

In an embodiment, it is determined during manufacturing of the magnetic storage medium reader system whether a third reader system provides less than a predetermined performance or is nonfunctioning. The third reader system includes a third reader element. The first head further includes the third reader element. Next, the magnetic storage medium reader system is reconfigured during the manufacturing to utilize the second reader system, but not utilize the third reader system, to read the magnetic storage medium, when the third reader system is determined during the manufacturing to provide less than a predetermined performance or is nonfunctioning.

In an embodiment, before there is a determination that the first reader system provides less than a predetermined performance or is nonfunctioning, the first reader system and the second reader system are utilized together to read the magnetic storage medium. In an alternative embodiment, the second reader system is only employed in lieu of the first reader system, when the first reader system is determined to provide less than a predetermined performance or is nonfunctioning.

In an embodiment, reconfiguring the reader system during manufacturing includes directing or redirecting components of a TDMR drive such as servo, data channel, and controller firmware in the event that a reader system provides less than a predetermined performance or is nonfunctioning. For example, a data storage device firmware may have a contingency code that is activated upon determination of a reader system failure during manufacturing. In an embodiment, predefined normal and failure mode parameters/configuration values (e.g. related to channel, servo, etc.) may be stored in a lookup table (e.g., stored in non-volatile memory). In an embodiment, the memory may also be a disk media, with parameters read off of the reserve tracks at drive power up and stored in the system DDR buffer memory during operation of the hard drive. If failure mode is initiated, the appropriate table values are used. Once the failover method is employed, the properly performing reader element(s) are employed. In an embodiment, if a reader system is determined to provide less than a predetermined performance during manufacturing, it may be used for a limited purpose.

Figure 5:
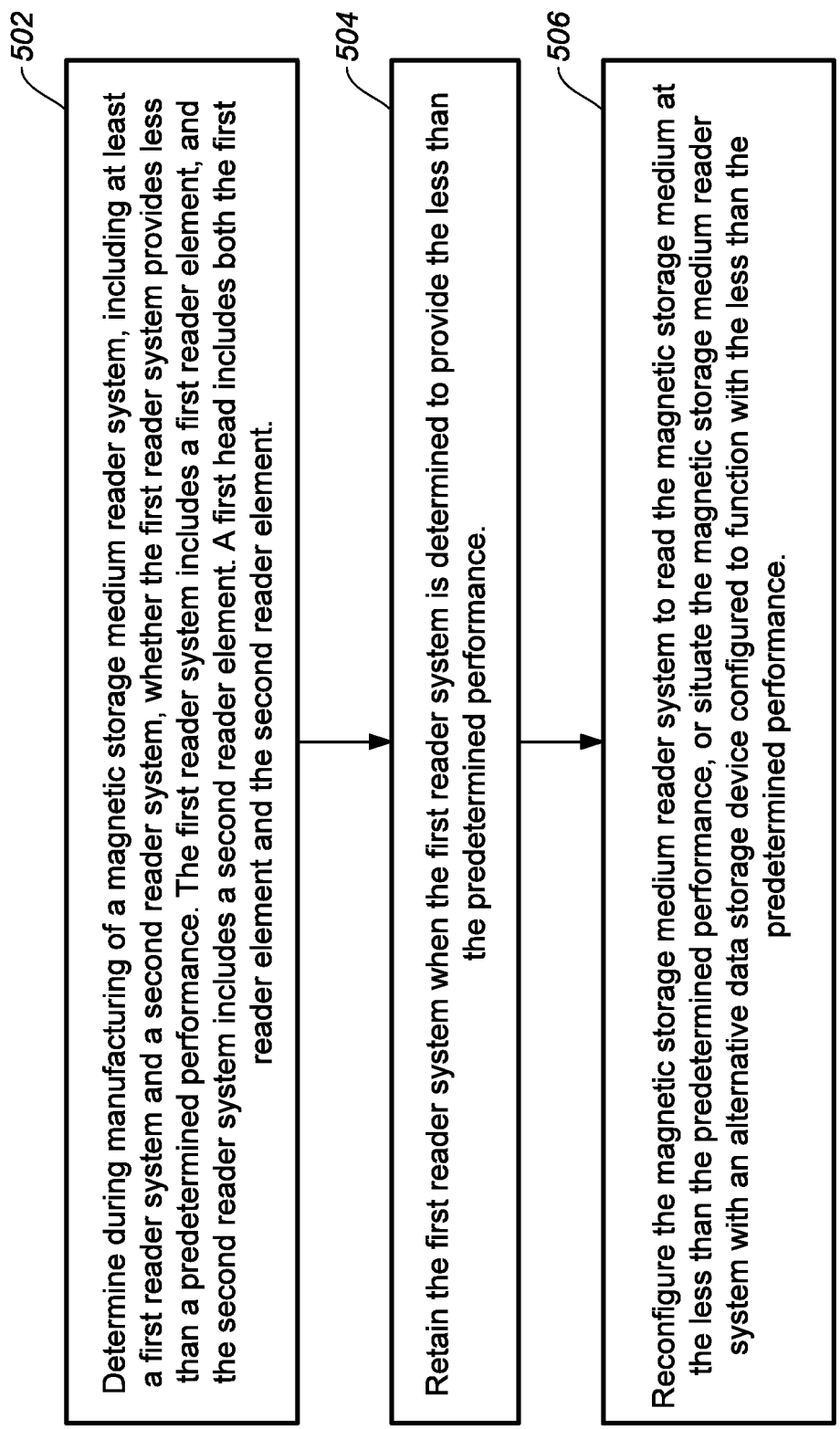
FIG. 5 is a flow diagram illustrating an alternative waterfall method for a data storage system, in an embodiment.

FIG. 5 is a flow diagram illustrating an alternative waterfall method for a data storage system, in an embodiment. As detailed in step 502, it is determined during manufacturing of a magnetic storage medium reader system, including at least a first reader system and a second reader system, whether the first reader system provides less than a predetermined performance, in an embodiment. The first reader system includes a first reader element, and the second reader system includes a second reader element. A first head includes both the first reader element and the second reader element. Next, as detailed in step 504, the first reader system is retained when the first reader system is determined to provide less than the predetermined performance. As detailed in step 506, the magnetic storage medium reader system is reconfigured to read the magnetic storage medium at less than the predetermined performance, or the magnetic storage medium reader system is situated with an alternative data storage device configured to function with less than the predetermined performance.

In an embodiment, the first reader system and the second reader system are situated with a non-two-dimensional magnetic recording (TDMR) data storage device, when the first reader system is determined to provide less than the predetermined performance.

In an embodiment, the magnetic storage medium reader system is manufactured with a two-dimensional magnetic recording (TDMR) head. Following steps 502, 504 and 506, in an embodiment, the method further includes situating the first reader system and the second reader system with a non-TDMR data storage device, rather than with the TDMR data storage device, when the first reader system is determined to provide less than the predetermined performance.

In an embodiment, the magnetic storage medium reader system further includes a third reader system, and the first reader system, the second reader system, and a third reader system are situated with a two-dimensional magnetic recording (TDMR) data storage device.

In an embodiment, following steps 502, 504 and 506, the magnetic storage medium reader system is reconfigured to read at a track per inch (TPI) data density that is less than if the first reader system provided at least the predetermined performance, and/or provide a read signal at a signal to noise ratio (SNR) that is less than if the first reader system provided at least the predetermined performance.

In an embodiment, inputs from two reader elements on one head are utilized in a reader array. In an alternative embodiment, more than two reader elements on one head may be utilized to read a magnetic storage medium, and signals from multiple reader elements may input to a read channel and control circuitry.

Any suitable control circuitry may be employed to implement the methods described herein, such as any suitable integrated circuit or circuits. For example, control circuitry may be implemented within a read channel integrated circuit, or in a component separate from the read channel, such as a disk controller, or certain operations described herein may be performed by a read channel and others by a disk controller. In an embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC. In embodiment, the control circuitry includes suitable logic circuitry, such as state machine circuitry.

In an embodiment, the control circuitry or DSP includes a microprocessor executing instructions, the instructions being operable to cause the microprocessor to perform the methods described herein. The instructions may be stored in any computer-readable medium. In an embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on.

In an embodiment, control circuitry detects when a first reader system provides less than a predetermined performance or is nonfunctioning, and thereafter causes a second reader system, but not the first reader system, to read the magnetic storage medium. In an embodiment, the control circuitry includes a controller and/or firmware. In an embodiment, one or more reader quality metrics (e.g., SNR of a signal) are detected by the control circuitry. In an embodiment, in-line calibrations may detect that a read element provides less than a predetermined performance or is non-functioning, despite failed sectors not being detected.

In an embodiment, when a first reader system and a second reader system are both determined to provide less than a predetermined performance, then control circuitry determines which reader system provides the better quality signal, and the reader system providing the better quality signal is utilized to read the magnetic storage medium.

In an embodiment, multiple reader element signals on one head input to one read channel. In an alternative embodiment, multiple reader element signals input to separate read channels. In yet another embodiment, multiple reader element signal pathways utilize portions of the same read channel, as well as utilize separate circuitry.

In an embodiment, when there is a determination that a first reader system provides less than a predetermined performance or is nonfunctioning, all of, or a portion of, the first reader system is not utilized to read the magnetic storage medium. For example, when only one portion of the first reader system is nonfunctioning (e.g., first reader system analog-to-digital converter), the first reader system may continue to use the functioning portion of first reader system, and alternatively use a portion of a second reader system (e.g., second reader system analog-to-digital converter) to read the magnetic storage medium.

Similarly, in an embodiment, when the second reader system is caused to read the magnetic storage medium, the second reader system may utilize one portion or more than one portion of the second reader system to read the magnetic storage medium.

In an embodiment, a third reader element is included with a head that includes a first reader element and a second reader element. When there is a determination that a first reader system and a third reader system provide less than a predetermined performance or is nonfunctioning, the second reader system, but not the first reader system or the third reader element (including, e.g., a third reader system) is caused to read the magnetic storage medium.

Figure 6:
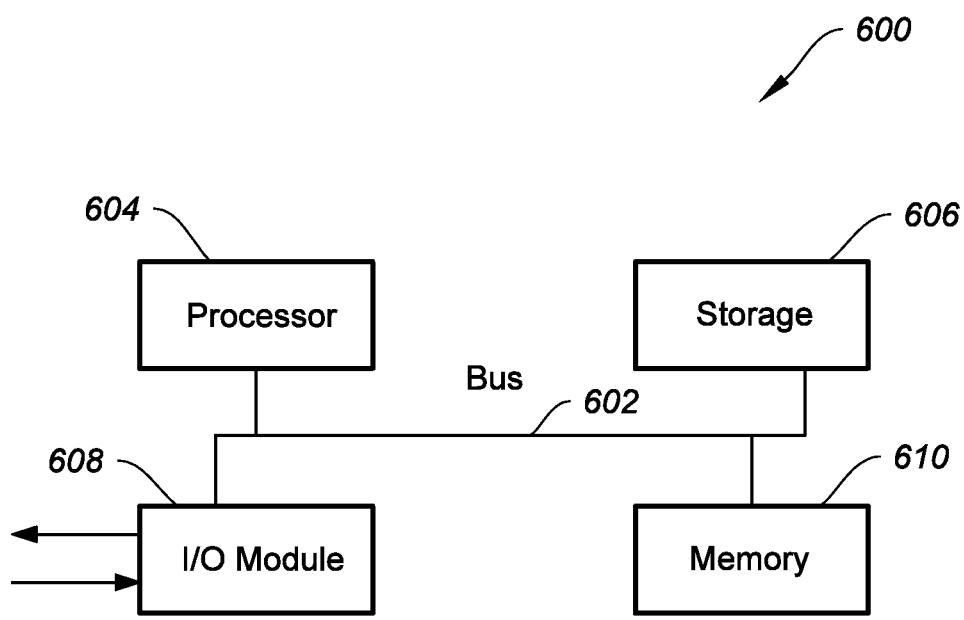
FIG. 6 is a sectional view representation illustrating components of a system that executes methods of an embodiment.

Turning now to FIG. 6, components of system 600 are illustrated, in an embodiment. System 600 includes processor module 604, storage module 606, input/output (I/O) module 608, memory module 610, and bus 602. Although system 600 is illustrated with these modules, other suitable arrangements (e.g., having more or less modules) known to those of ordinary skill in the art may be used. For example, system 600 may be a logic implemented state machine or a programmable logic controller.

In an embodiment, the methods described herein are executed by system 600. Specifically, processor module 604 executes one or more sequences of instructions contained in memory module 610 and/or storage module 606. In one example, instructions may be read into memory module 610 from another machine-readable medium, such as storage module 606. In another example, instructions may be read directly into memory module 610 from I/O module 608, for example from an operator via a user interface. Information may be communicated from processor module 604 to memory module 610 and/or storage module 606 via bus 602 for storage. In an example, the information may be communicated from processor module 604, memory module 610, and/or storage module 606 to I/O module 608 via bus 602. The information may then be communicated from I/O module 608 to an operator via the user interface.

Memory module 610 may be random access memory or other dynamic storage device for storing information and instructions to be executed by processor module 604. In an example, memory module 610 and storage module 606 are both a machine-readable medium.

In an embodiment, processor module 604 includes one or more processors in a multi-processing arrangement, where each processor may perform different functions or execute different instructions and/or processes contained in memory module 610 and/or storage module 606. For example, one or more processors may execute instructions for determining read element performance during the manufacturing of a magnetic storage medium reader system, and one or more processors may execute instructions for input/output functions. Also, hard-wired circuitry may be used in place of or in combination with software instructions to implement various example embodiments. Thus, embodiments are not limited to any specific combination of hardware circuitry and software.

The term "circuit" or "circuitry" as used herein includes all levels of available integration, for example, from discrete logic circuits to the highest level of circuit integration such as VLSI, and includes programmable logic components programmed to perform the functions of embodiments as well as general-purpose or special-purpose processors programmed with instructions to perform those functions.

Bus 602 may be any suitable communication mechanism for communicating information. Processor module 604, storage module 606, I/O module 608, and memory module 610 are coupled with bus 602 for communicating information between any of the modules of system 600 and/or information between any module of system 600 and a device external to system 600. For example, information communicated between any of the modules of system 600 may include instructions and/or data.

The term "machine-readable medium" as used herein, refers to any medium that participates in providing instructions to processor module 604 for execution. Such a medium may take many forms, including, but not limited to, non-volatile media, and volatile media. Non-volatile media includes, for example, optical or magnetic disks, such as storage module 606. Volatile media includes dynamic memory, such as memory module 610. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

In an embodiment, a non-transitory machine-readable medium is employed including executable instructions for a data storage device. The instructions include code for determining during manufacturing of a magnetic storage medium reader system, including at least a first reader system and a second reader system, whether the first reader system provides less than a predetermined performance or is nonfunctioning. The first reader system includes a first reader element, and the second reader system includes a second reader element. A first head includes both the first reader element and the second reader element. The instructions further include code for reconfiguring the magnetic storage medium reader system during the manufacturing to utilize the second reader system, but not utilize the first reader system, to read the magnetic storage medium, when the first reader system is determined during the manufacturing to provide less than the predetermined performance or is nonfunctioning.

In an embodiment, the non-transitory machine-readable medium further includes executable instructions for determining during manufacturing of a magnetic storage medium reader system, including at least a first reader system and a second reader system, whether the first reader system provides less than a predetermined performance. The first reader system includes a first reader element, and the second reader system includes a second reader element. A first head includes both the first reader element and the second reader element.

The instructions further include code for retaining the first reader system when the first reader system is determined to provide less than a predetermined performance.

The instructions further include code for reconfiguring the magnetic storage medium reader system to read the magnetic storage medium at the less than the predetermined performance, or situating the magnetic storage medium reader system with an alternative data storage device configured to function with less than the predetermined performance.

The various features and processes described herein may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the embodiments disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

Modifications and variations may be made to the disclosed embodiments while remaining within the spirit and scope of the methods, systems and apparatus. The implementations described above and other implementations are within the scope of the following claims.

We claim:

1. A magnetic storage medium reader system for a data storage device, comprising:
   at least a first reader system and a second reader system, the first reader system including a first reader element, and the second reader system including a second reader element;
   a first head including the first reader element and the second reader element; and
   control circuitry reconfigured during manufacturing of the magnetic storage medium reader system to cause the second reader system, but not the first reader system, to read a magnetic storage medium, the first reader system determined during the manufacturing to provide less than a predetermined performance or to be nonfunctioning.

2. The magnetic storage medium reader system of claim 1, wherein the second reader system is utilized with a non-two-dimensional magnetic recording (TDMR) data storage device.

3. The magnetic storage medium reader system of claim 1, further comprising a third reader system to read the magnetic storage medium, wherein the second reader system and the third reader system are utilized with a two-dimensional magnetic recording (TDMR) data storage device.

4. The magnetic storage medium reader system of claim 1, wherein the magnetic storage medium reader system is reconfigured to at least one of:

read at a track per inch (TPI) data density that is less than if the first reader system provided at least the predetermined performance and was additionally utilized, and provide a read signal at a signal to noise ratio (SNR) that is less than if the first reader system provided at least the predetermined performance and was additionally utilized.

5. The magnetic storage medium reader system of claim 1, wherein:

utilizing the second reader system to read the magnetic storage medium comprises utilizing one portion or more than one portion of the second reader system to read the magnetic storage medium; and not utilizing the first reader system to read the magnetic storage medium comprises not utilizing one portion or more than one portion of the first reader system.

6. A method for manufacturing a data storage device, comprising:

determining during manufacturing of a magnetic storage medium reader system, including at least a first reader system and a second reader system, whether the first reader system provides less than a predetermined performance or is nonfunctioning, wherein the first reader system includes a first reader element, and the second reader system includes a second reader element, and wherein a first head includes both the first reader element and the second reader element; and reconfiguring the magnetic storage medium reader system during the manufacturing to utilize the second reader system, but not utilize the first reader system, to read the magnetic storage medium, when the first reader system is determined during the manufacturing to provide the less than the predetermined performance or is nonfunctioning.

7. The method of claim 6, wherein the manufacturing is manufacturing of a magnetic storage medium reader system that includes a two-dimensional magnetic recording (TDMR) head, the method further comprising utilizing the second reader system with a non-TDMR data storage device, rather than with the TDMR data storage device, when the first reader system is determined to provide the less than the predetermined performance or is nonfunctioning.

8. The method of claim 6, further comprising utilizing the second reader system with a non-two-dimensional magnetic recording (TDMR) data storage device, when the first reader system is determined to provide the less than the predetermined performance or is nonfunctioning.

9. The method of claim 6, further comprising utilizing the second reader system and a third reader system with a two-dimensional magnetic recording (TDMR) data storage device, wherein the magnetic storage medium reader system further includes the third reader system.

10. The method of claim 6, further comprising reconfiguring the magnetic storage medium reader system to at least one of:

read at a track per inch (TPI) data density that is less than if the first reader system provided at least the predetermined performance and was additionally utilized, and provide a read signal at a signal to noise ratio (SNR) that is less than if the first reader system provided at least the predetermined performance and was additionally utilized.

11. The method of claim 6, wherein the second reader system includes the second reader element and a second read channel, the second reader system structured such that when a second reader element signal is created, the second reader element signal travels from the second reader element to the second read channel; and wherein the first reader system includes the first reader element and a first read channel.

12. The method of claim 6, wherein:

utilizing the second reader system to read the magnetic storage medium comprises utilizing one portion or more than one portion of the second reader system to read the magnetic storage medium; and not utilizing the first reader system to read the magnetic storage medium comprises not utilizing one portion or more than one portion of the first reader system.

13. The method of claim 6, wherein not utilizing the first reader system comprises including at least one component of the first reader system with the magnetic storage medium reader system, but not utilizing a signal from the first reader system.

14. The method of claim 6, further comprising:

determining during the manufacturing of the magnetic storage medium reader system whether a third reader system provides less than the predetermined performance or is nonfunctioning, wherein the third reader system includes a third reader element, and wherein the first head further includes the third reader element; and reconfiguring the magnetic storage medium reader system during the manufacturing to utilize the second reader system, but not utilize the third reader system, to read the magnetic storage medium, when the third reader system is determined during the manufacturing to provide the less than the predetermined performance or is nonfunctioning.

15. The method of claim 6, wherein reconfiguring the magnetic storage medium reader system during the manufacturing to utilize the second reader system comprises configuring the second reader element to reposition, during reading of a target track, from offset of the centerline of the target track to centerline of the target track.

16. A method for a data storage device, comprising:

determining during manufacturing of a magnetic storage medium reader system, including at least a first reader system and a second reader system, whether the first reader system provides less than a predetermined performance, wherein the first reader system includes a first reader element, and the second reader system includes a second reader element, and wherein a first head includes both the first reader element and the second reader element;

retaining the first reader system when the first reader system is determined to provide the less than the predetermined performance; and reconfiguring the magnetic storage medium reader system to read the magnetic storage medium at the less than the predetermined performance, or situating the magnetic storage medium reader system with an alternative data storage device configured to function with the less than the predetermined performance.

17. The method of claim 16, wherein the manufacturing is manufacturing of a magnetic storage medium reader system that includes a two-dimensional magnetic recording (TDMR) head, the method further comprising situating the first reader system and the second reader system with a non-TDMR data storage device, rather than with the TDMR data storage device, when the first reader system is determined to provide the less than the predetermined performance.

18. The method of claim 16, further comprising situating the first reader system and the second reader system with a non-two-dimensional magnetic recording (TDMR) data storage device, when the first reader system is determined to provide the less than the predetermined performance.

19. The method of claim 16, further comprising situating the first reader system, the second reader system, and a third reader system with a two-dimensional magnetic recording (TDMR) data storage device, wherein the magnetic storage medium reader system further includes the third reader system.

20. The method of claim 16, further comprising reconfiguring the magnetic storage medium reader system to at least one of:
   read at a track per inch (TPI) data density that is less than if the first reader system provided at least the predetermined performance, and
   provide a read signal at a signal to noise ratio (SNR) that is less than if the first reader system provided at least the predetermined performance.

\* \* \* \* \*